(12) United States Patent
Awatsu (10) Patent No.: US 11,321,032 B2
(45) Date of Patent: May 3, 2022

(54) PRINT CONTROL DEVICE FOR ACQUIRING PLURAL PIECES OF DATA FROM PLURAL USERS FOR COLLECTIVE PRINTING AND RESTRICTING VIEWING OF THE DATA BEFORE PRINTING

(71) Applicant: FUJIFILM BUSINESS INNOVATION CORP., Tokyo (JP)

(72) Inventor: Yusaku Awatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/158,103

(22) Filed: Jan. 26, 2021

(65) Prior Publication Data

US 2022/0035580 A1 Feb. 3, 2022

(30) Foreign Application Priority Data

Jul. 30, 2020 (JP) .............................. JP2020-129596

(51) Int. Cl.
*G06F 3/12* (2006.01)
(52) U.S. Cl.
CPC .......... *G06F 3/1238* (2013.01); *G06F 3/1222* (2013.01); *G06F 3/1292* (2013.01)

(58) Field of Classification Search
None
See application file for complete search history.

(56) References Cited

U.S. PATENT DOCUMENTS

| 8,099,384 B2* | 1/2012 | Miyazawa | H04N 1/4426 707/603 |
| 8,619,276 B2* | 12/2013 | Nishiguchi | G06F 16/93 358/1.14 |
| 2006/0055968 A1* | 3/2006 | Sato | H04N 1/32358 358/1.15 |
| 2016/0182762 A1* | 6/2016 | Eum | H04N 1/4413 358/1.14 |

FOREIGN PATENT DOCUMENTS

JP 2017-220029 A 12/2017

* cited by examiner

*Primary Examiner* — Thomas D Lee
(74) *Attorney, Agent, or Firm* — Oliff PLC (57) ABSTRACT

A print control device includes: a processor configured to: receive a print request from a specific user to collectively print plural pieces of data held by plural users; acquire one or more of the plural pieces of data from one or more of the plural users in a state where other users are restricted from viewing the one or more pieces of data, in response to the receiving of the print request; and perform control such that the one or more pieces of data are printed.

15 Claims, 8 Drawing Sheets

| FILE ID | FILE STORAGE LOCATION | FILE EXCHANGE FLAG | FILE NAME | USER ID |
|---|---|---|---|---|
| 00000001 | D:¥Data¥00000001.ZIP | true | present.jpg | userIdAAAA |
| | | | 20191107.jpg | userIdBBBB |
| | | | memorial.jpg | userIdCCCC |
| 00000002 | D:¥Data¥00000002.ZIP | true | NEW YEAR'S CARD.jpg | userIdAAAA |
| | | | 2019 NEW YEAR'S CARD ILLUSTRATION.jpg | userIdBBBB |
| | | | NewYearsCard.jpg | userIdCCCC |
| 00000003 | D:¥Data¥DSC2001.jpeg | false | - | - |

FIG.7

FIG.8

PRINT CONTROL DEVICE FOR ACQUIRING PLURAL PIECES OF DATA FROM PLURAL USERS FOR COLLECTIVE PRINTING AND RESTRICTING VIEWING OF THE DATA BEFORE PRINTING

CROSS-REFERENCE TO RELATED APPLICATIONS

This application is based on and claims priority under 35 USC 119 from Japanese Patent Application No. 2020-129596 filed Jul. 30, 2020.

BACKGROUND

(i) Technical Field

The present disclosure relates to a print control device and a non-transitory computer readable medium.

(ii) Related Art

An image processing apparatus is known which transmits image data that stores additional information such as a user number, a mail address, a password, a prepaid card, and the like to a terminal of a third party; reads the information such as the user number, the mail address, the password, the prepaid card, and the like from the additional information when the image data that stores the additional information are read, and performs an authentication process or download of image data stored in a contents server and a payment process of an image printing fee by communicating with an authentication server or a prepaid card server based on the read information (see, for example, JP-A-2017-220029).

SUMMARY

Data held by plural users may be printed in response to a print request from a specific user. In such a case, when the specific user acquires the data from the plural users and makes a print request using the data, the data to be printed will be known to the specific user before printing.

Aspects of non-limiting embodiments of the present disclosure relate to printing data held by plural users in response to a print request from a specific user while preventing the data to be printed from being known to the specific user before printing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print control device including: a processor configured to: receive a print request from a specific user to collectively print plural pieces of data held by plural users; acquire one or more of the plural pieces of data from one or more of the plural users in a state where other users are restricted from viewing the one or more pieces of data, in response to the receiving of the print request; and perform control such that the one or more pieces of data are printed.

BRIEF DESCRIPTION OF THE DRAWINGS

Exemplary embodiment(s) of the present disclosure will be described in detail based on the following figures, wherein.

DETAILED DESCRIPTION

Hereinafter, an exemplary embodiment of the present disclosure will be described in detail with reference to the accompanying drawings.

Overall Configuration of Print System

Figure 1:
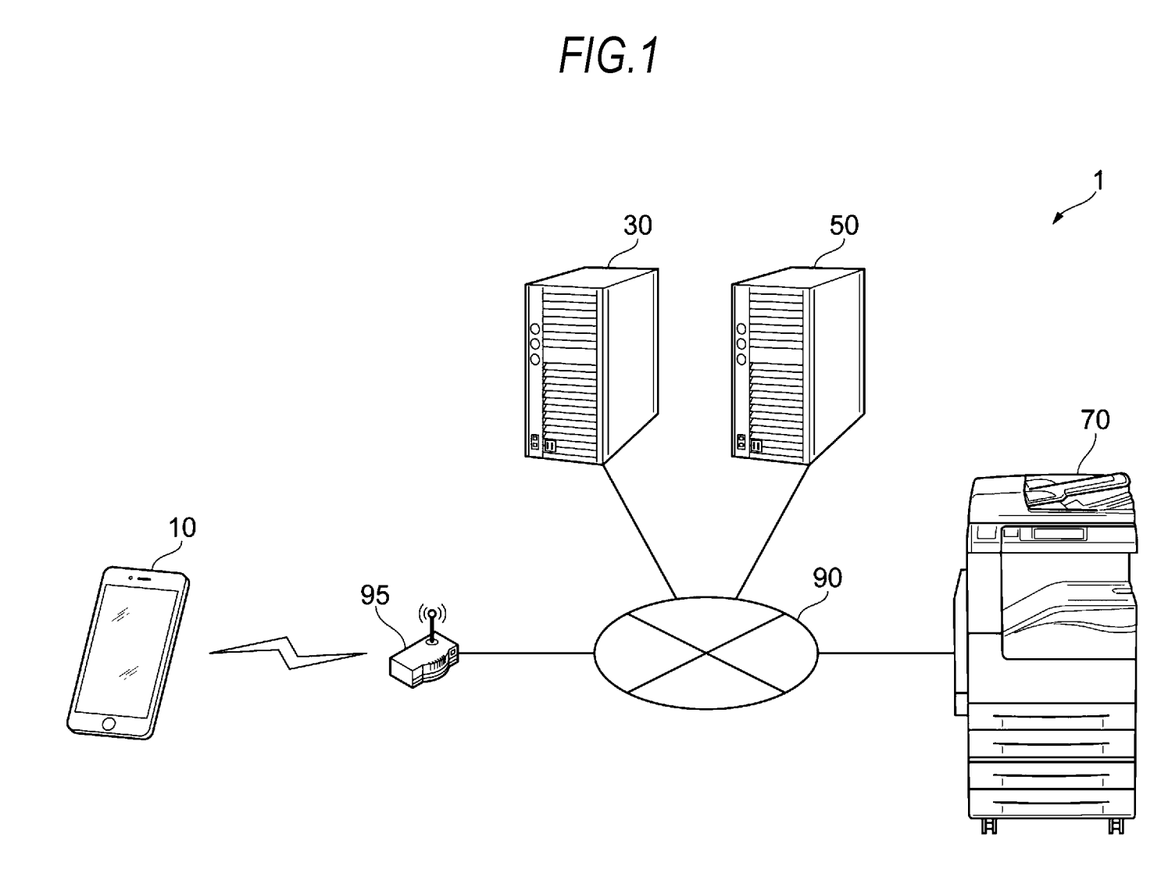
FIG. 1 is a view illustrating an example of an overall configuration of a print system to which an exemplary embodiment of the present disclosure is applied.

FIG. 1 is a diagram illustrating an example of an overall configuration of a print system 1 to which the present exemplary embodiment is applied. As illustrated in the figure, the print system 1 includes a mobile terminal 10, a messaging server 30, a print server 50, and an image processing apparatus 70. The mobile terminal 10 may be wirelessly connected to a communication line 90 via an access point 95 by wireless communication such as Wi-Fi (registered trademark). Further, the messaging server 30, the print server 50, and the image processing apparatus 70 are connected to the communication line 90.

The mobile terminal 10 is a terminal device used by a user who uses the print system 1. An application for providing a messaging service (a messaging service app) is installed on the mobile terminal 10. Here, the messaging service is a service that enables a user to exchange an instant message with another user by installing the messaging service app on the mobile terminal 10. The messaging service enables the exchange of instant messages, for example as messages input by the user of the mobile terminal 10 and another user are displayed as if a conversation is taking place in a talk room virtually provided on a screen of the mobile terminal 10. For example, a smartphone may be used as the mobile terminal 10. Although only one mobile terminal 10 is illustrated in the figure, plural mobile terminals 10 may exist. In particular, in the following, a mobile terminal 10 used by a user A is referred to as a mobile terminal 10a, a mobile terminal 10 used by a user B is referred to as a mobile terminal 10b, and a mobile terminal 10 used by a user C is referred to as a mobile terminal 10c.

The messaging server 30 is a server computer that provides the above-mentioned messaging service in response to a request sent from the mobile terminal 10 by a user's operation. For example, a general-purpose personal computer may be used as the messaging server 30.

The print server 50 is a server computer that provides a print service for printing a file posted by a user in a talk room of the messaging service of the mobile terminal 10. Specifically, the print server 50 registers, as a file for printing, a file posted in the talk room of the messaging service of the mobile terminal 10 in response to a request sent from the messaging server 30 by a user operating the mobile terminal 10. Then, the print server 50 outputs the file for printing, as print data, to the image processing apparatus 70 in response to a request sent from the image processing apparatus 70 by a user operation. In the following, an image will be described as an example of the file posted in the talk room of the messaging service. It is noted that this is merely an example. The file posted in the talk room of the messaging service may be a file in another format such as PDF as long as the file is in a printable format. For example, a general-purpose personal computer may be used as the print server 50. In the present exemplary embodiment, the print server 50 is provided as an example of a print control device.

The image processing apparatus 70 is an apparatus that performs image processes such as forming an image on a recording medium such as paper, reading an image from a recording medium such as paper, transmitting an image to public lines, receiving an image from public lines, and the like. Alternatively, at least one of these may be performed. For example, the image processing apparatus 70 is a printer from the viewpoint of only forming an image, a scanner from the viewpoint of only reading an image, a copier from the viewpoint of reading and forming an image, and a facsimile from the viewpoint of (i) reading and transmitting an image or (ii) receiving and forming an image. Although only one image processing apparatus 70 is illustrated in the figure, plural image processing apparatuses 70 may exist.

The communication line 90 is a communication unit used for information communication between the mobile terminal 10 and the messaging server 30, between the messaging server 30 and the print server 50, between the print server 50 and the image processing apparatus 70, and the like. For example, the Internet may be used as the communication line 90.

Hardware Configuration of Mobile Terminal

Figure 2:
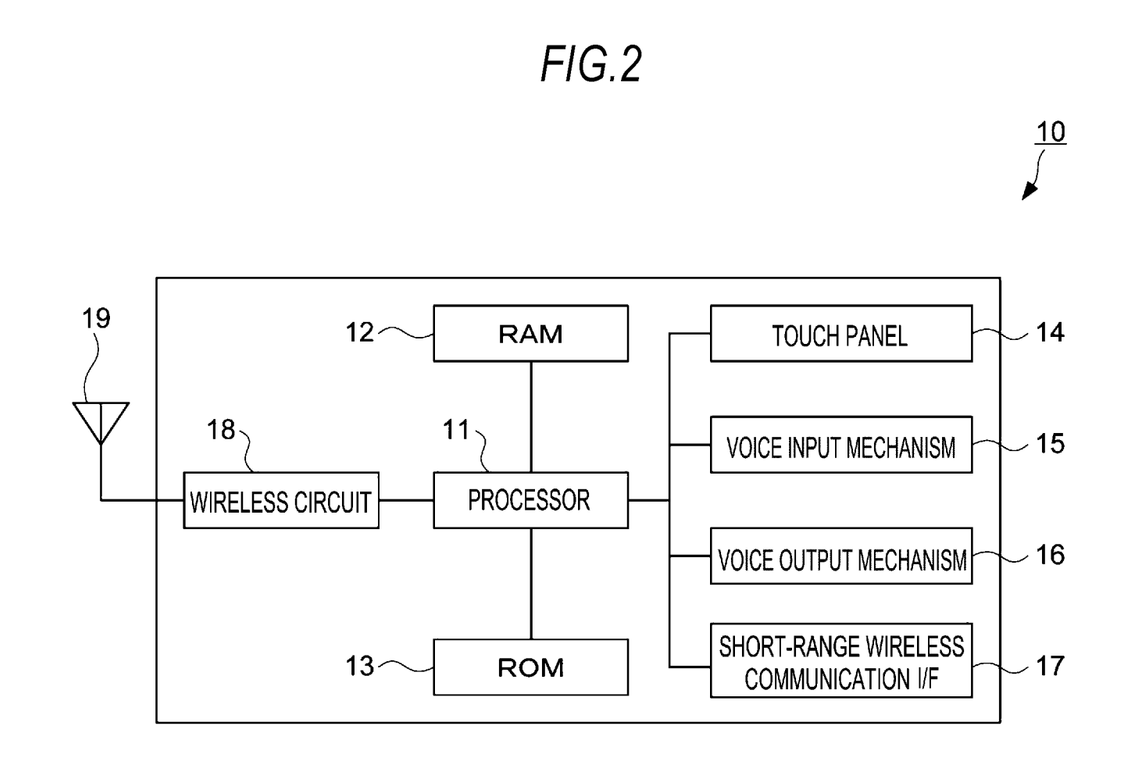
FIG. 2 is a diagram illustrating an example of a hardware configuration of a mobile terminal according to the exemplary embodiment of the present disclosure.

FIG. 2 is a diagram illustrating an example of a hardware configuration of the mobile terminal 10 according to the present exemplary embodiment. As illustrated in the figure, the mobile terminal 10 includes a processor 11 as an operation unit, a RAM 12 and a ROM 13 as memory units, a touch panel 14 that displays various information and receiving operation input from a user, a voice input mechanism 15 such as a microphone, a voice output mechanism 16 such as a speaker, and a short-range wireless communication interface that exchanges various information with the image processing apparatus 70 by short-range wireless communication such as NFC (Near Field Communication) (hereinafter referred to as "I/F") 17. The mobile terminal 10 also includes a wireless circuit 18 and an antenna 19 for performing wireless communication via a base station. Here, although not shown, the wireless circuit 18 includes a baseband LSI that performs signal processing for digital data transmitted and received wirelessly.

Hardware Configuration of Print Server

Figure 3:
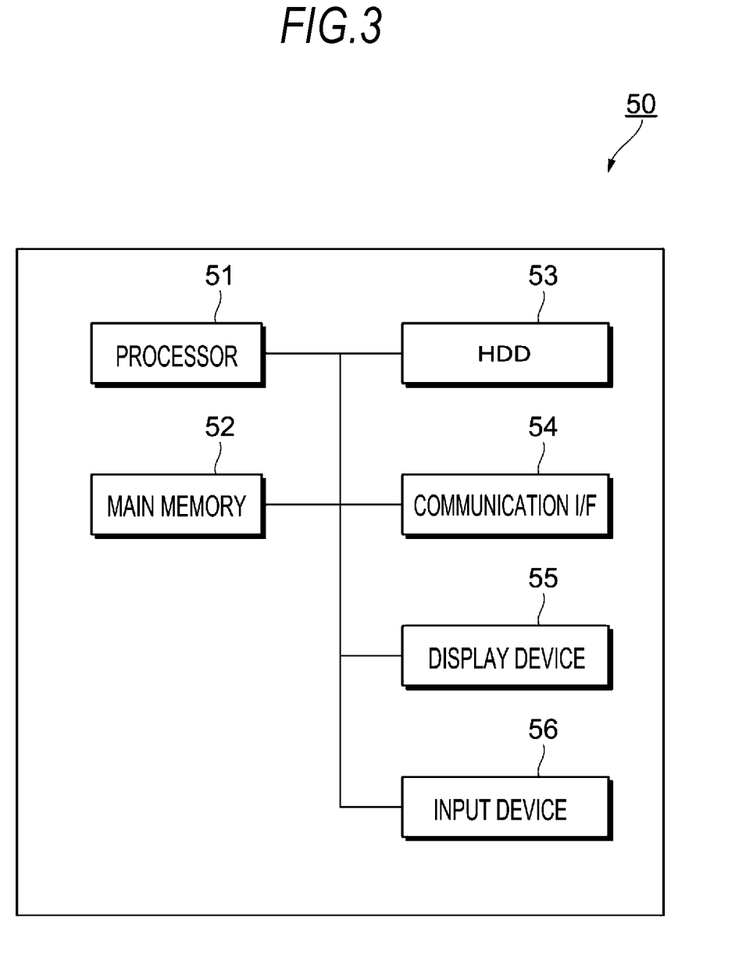
FIG. 3 is a diagram illustrating an example of a hardware configuration of a print server according to the exemplary embodiment of the present disclosure.

FIG. 3 is a diagram illustrating an example of a hardware configuration of the print server 50 according to the present exemplary embodiment. As illustrated in the figure, the print server 50 includes a processor 51 as an operation unit and a main memory 52 and an HDD (Hard Disk Drive) 53 as a storage unit. Here, the processor 51 executes various types of software such as an OS (Operating System) and an application to implement each function to be described later. The main memory 52 is a memory area that stores various types of software and data and the like used for executing the software, and the HDD 53 is a memory area that stores input data to various types of software and output data from various types of software. Further, the print server 50 includes a communication I/F 54 for communicating with the outside, a display device 55 such as a display, and an input device 56 such as a keyboard and a mouse.

The hardware configuration illustrated in FIG. 3 may also be regarded as the hardware configuration of the messaging server 30. It is noted that when the messaging server 30 is described, the processor 51, the main memory 52, the HDD 53, the communication I/F 54, the display device 55, and the input device 56 in FIG. 3 are referred to as the processor 31, the main memory 32, the HDD 33, the communication I/F 34, the display device 35, and the input device 36, respectively.

Hardware Configuration of Image Processing Apparatus

Figure 4:
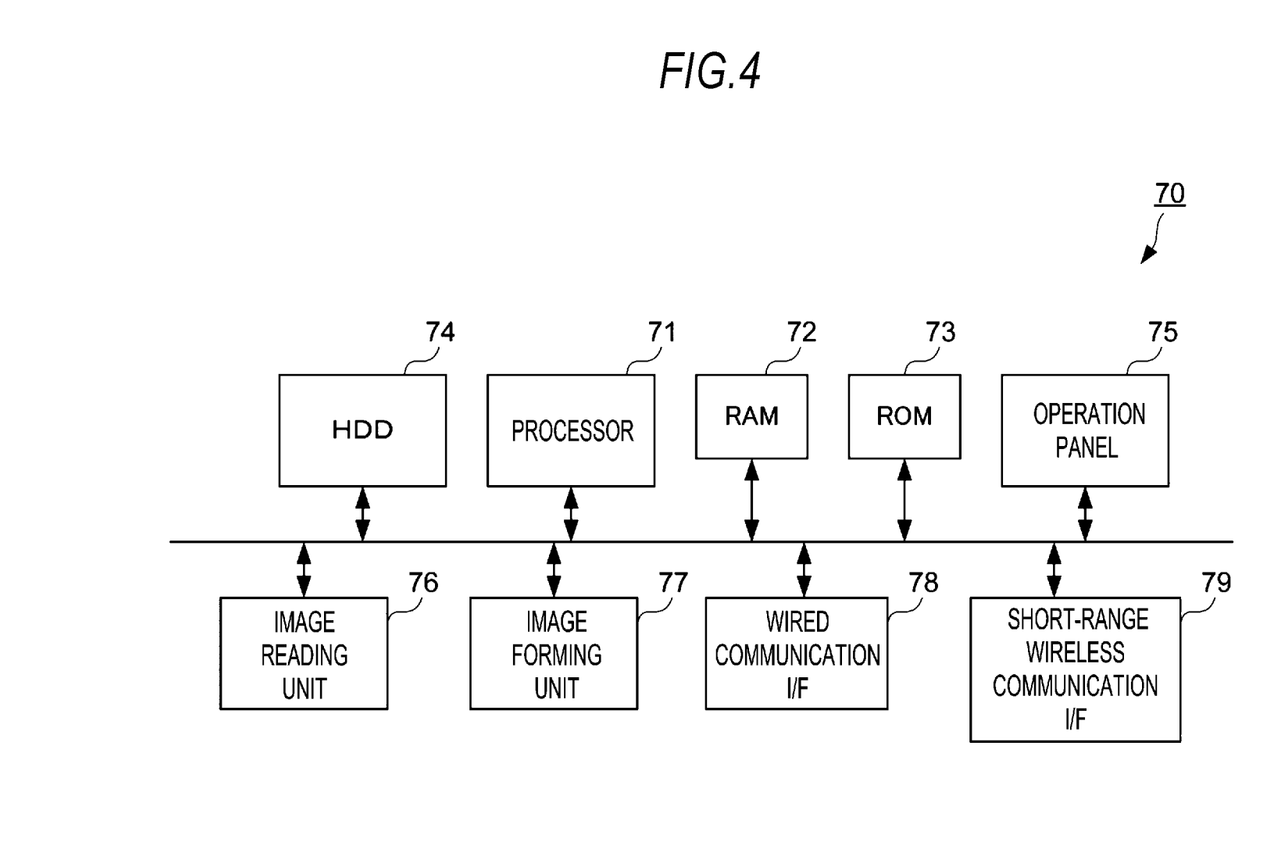
FIG. 4 is a diagram illustrating an example of a hardware configuration of an image processing apparatus according to the exemplary embodiment of the present disclosure.

FIG. 4 is a diagram illustrating an example of a hardware configuration of the image processing apparatus 70 according to the present exemplary embodiment. As illustrated in the figure, the image processing apparatus 70 includes a processor 71, a RAM (Random Access Memory) 72, a ROM (Read Only Memory) 73, an HDD (Hard Disk Drive) 74, an operation panel 75, an image reading unit 76, an image forming unit 77, a wired communication I/F 78, and a short-range wireless communication I/F 79.

The processor 71 loads and executes various programs stored in the ROM 73 or the like into the RAM 72 to implement each function to be described later.

The RAM 72 is a memory used as a working memory or the like of the processor 71. The ROM 73 is a memory that stores various programs and the like executed by the processor 71. The HDD 74 is, for example, a magnetic disk device that stores image data read by the image reading unit 76, image data used in image formation in the image forming unit 77, and the like.

The operation panel 75 is, for example, a touch panel that displays various information and receives operation input from a user. Here, the operation panel 75 includes a display on which various information is displayed, and a position detection sheet that detects a position pointed by a pointing unit such as a finger or a stylus pen. Alternatively, a display and a keyboard may be used instead of the touch panel.

The image reading unit 76 reads out an image recorded on a recording medium such as paper. Here, the image reading unit 76 is, for example, a scanner and may use either a CCD method in which reflected light with respect to light emitted from a light source to a document is reduced by a lens and received by a CCD (Charge Coupled Devices), or a CIS method in which reflected light with respect to light emitted sequentially from an LED light source to a document is received by a CIS (Contact Image Sensor).

The image forming unit 77 forms an image on a recording medium such as paper. Here, the image forming unit 77 is, for example, a printer and may use either an electrophotographic method in which toner adhered to a photoconductor is transferred to a recording medium to form an image, or an inkjet method in which ink is ejected onto a recording medium to form an image.

The wired communication I/F 78 exchanges various information with another device, for example, the print server 50, via the communication line 90. The short-range wireless communication I/F 79 exchanges various information with the mobile terminal 10 by short-range wireless communication such as NFC.

Outline of Present Exemplary Embodiment

In the print system 1 having such a configuration, in the present exemplary embodiment, the print server 50 receives a print request from a specific user to collectively print plural pieces of data held by plural users, acquires one or more of the plural pieces of data from one or more of the plural users in a state where other users are restricted from viewing the one or more pieces of data, in response to the receiving of the print request, and performs control such that the one or more pieces of data are printed.

Here, as the state where the viewing is restricted, a state implemented by individual use units that the one or more users individually use may be considered. In this case, the individual use units may be posting areas on a messaging service for the individual users or e-mails.

Alternatively, as the state where the viewing is restricted, a state implemented by having one or more users store one or more pieces of data in a common memory area, but restricting other users from viewing the one or more pieces of data may be also considered. In this case, the memory area may be designated by a uniform resource locator (URL).

In this way, there are various possible states where the viewing is restricted, but the case implemented by the posting areas (individual talk rooms) on the messaging service for the individual users will be here explained as an example.

Further, performing control such that one or more pieces of data are printed may be performing control in any manner. Here, a case where the print server 50 performs control such that one piece of data identification information identifying one or more pieces of data is notified to a specific user and the one or more pieces of data identified by the data identification information are printed when the data identification information is received from the specific user will be explained as an example.

Functional Configuration of Print System

Figure 5:
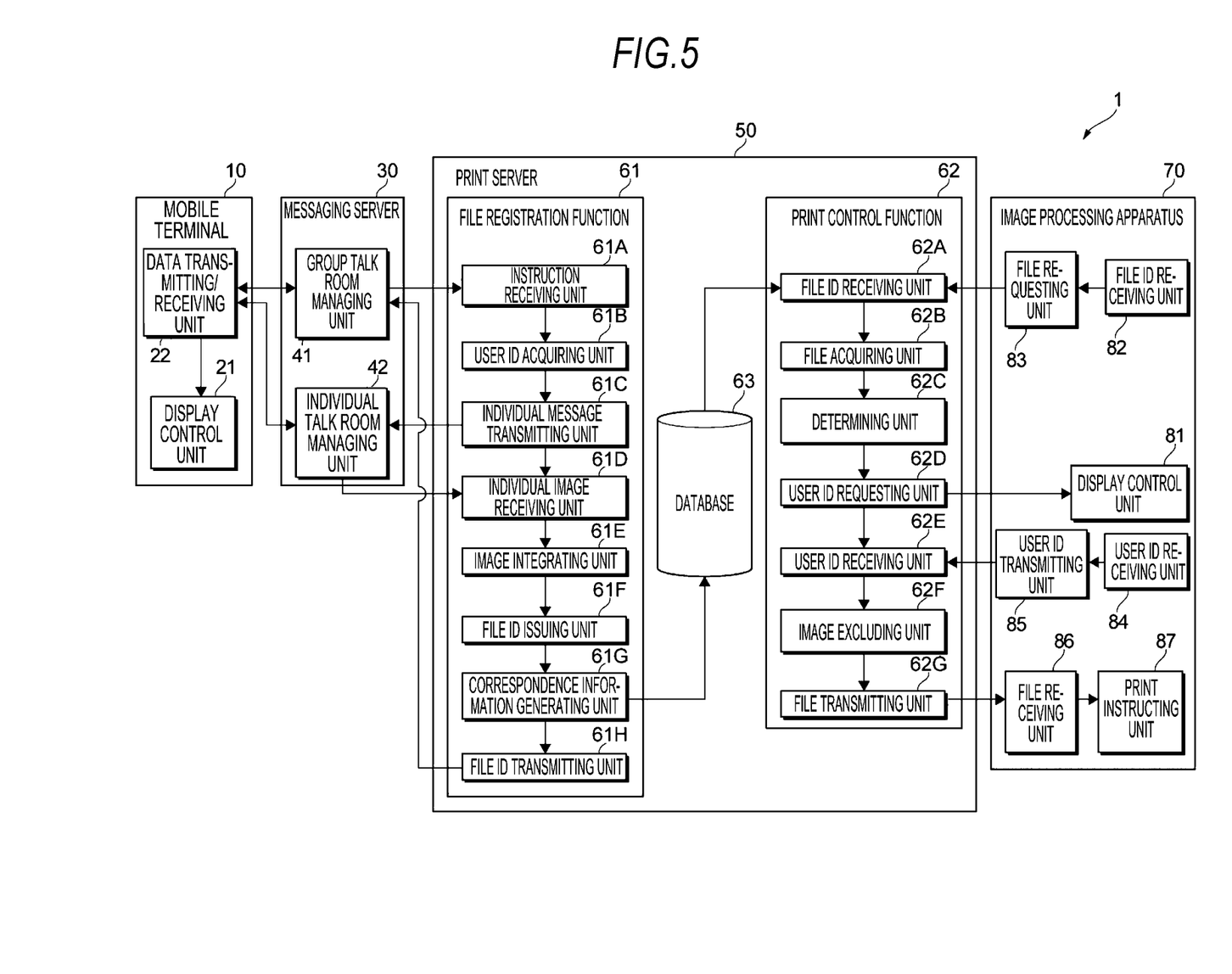
FIG. 5 is a block diagram illustrating an example of a functional configuration of the print system according to the exemplary embodiment of the present disclosure.

FIG. 5 is a block diagram illustrating an example of a functional configuration of the print system 1 according to the present exemplary embodiment.

First, the functional configuration of the mobile terminal 10 will be described. As illustrated in the figure, the mobile terminal 10 includes a display control unit 21 and a data transmitting/receiving unit 22.

The display control unit 21 controls the touch panel 14 (see FIG. 2) so as to display a message from the messaging server 30 or the result of an operation. In particular, the display control unit 21 controls the touch panel 14 so as to display a file ID sent from the messaging server 30. Here, the file ID is identification information that identifies a file, and may be displayed on the touch panel 14 and read by the image processing apparatus 70 to request a printing of the file. The file ID may be embedded in, for example, a QR code (registered trademark). The file ID is an example of data identification information that identifies data.

The data transmitting/receiving unit 22 transmits a message or a file to the messaging server 30 or receives a message from the messaging server 30.

These functional units are implemented by the cooperation of software and hardware resources. Specifically, these functional units are implemented in the manner that the processor 11 reads a program for implementing the functional units from, for example, the ROM 13 into the RAM 12, and executes the program.

Next, the functional configuration of the messaging server 30 will be described. As illustrated in the figure, the messaging server 30 includes a group talk room managing unit 41 and an individual talk room managing unit 42.

The group talk room managing unit 41 manages a group talk room in which plural users who are members of a group and a BOT of the print server 50 participate. Here, the BOT of the print server 50 is a program that registers an image as a file for printing when the image is passed from a user. Therefore, when the BOT of the print server 50 is added to a group, it is possible for a user who is participating in the group at that time passes an image to the BOT of the print server 50 to register the image as a file for printing. Hereinafter, the BOT of the print server 50 is simply referred to as a "BOT".

The individual talk room managing unit 42 manages individual talk rooms in which individual users and BOTs participate. The individual talk room may also be said to be a one-to-one talk room between individual users and BOTs.

These functional units are implemented by the cooperation of software and hardware resources. Specifically, these functional units are implemented in the manner that the processor 31 reads a program for implementing the functional units from, for example, the HDD 33 into the main memory 32, and executes the program.

Next, the functional configuration of the print server 50 will be described. As illustrated in the figure, the print server 50 includes, as a file registration function 61, an instruction receiving unit 61A, a user ID acquiring unit 61B, an individual message transmitting unit 61C, an individual image receiving unit 61D, an image integrating unit 61E, a file ID issuing unit 61F, a correspondence information generating unit 61G, and a file ID transmitting unit 61H. Further, the print server 50 includes, as a print control function 62, a file ID receiving unit 62A, a file acquiring unit 62B, a determining unit 62C, a user ID requesting unit 62D, a user ID receiving unit 62E, an image excluding unit 62F, and a file transmitting unit 62G. Further, the print server 50 includes a database 63.

The instruction receiving unit 61A receives from the messaging server 30 a file exchange instruction given on a group talk room in which plural users and BOTs exist. In the present exemplary embodiment, the instruction receiving unit 61A is provided as an example of a unit that receives a print request from a specific user to collectively print plural pieces of data held by plural users.

The user ID acquiring unit 61B acquires a user ID that identifies a user participating in the group talk room. Here, the user ID may be, for example, a character string. Further, the user ID may be acquired from, for example, the group talk room managing unit 41 of the messaging server 30.

The individual message transmitting unit 61C transmits an image transmission request to the messaging server 30 such that a message requesting the user to transmit a file exchange image is transmitted from the BOT in the individual talk room.

The individual image receiving unit 61D receives from the messaging server 30 the file exchange image transmitted from the user to the BOT in the individual talk room. That is, the individual image receiving unit 61D receives the file exchange image from a unit that is accessible only by an individual user. It is noted that the file exchange image is not always received from units that are accessible to only individual users, but may be received from a unit that is accessible to all users but that other users are restricted from viewing. In the present exemplary embodiment, the individual image receiving unit 61D is provided as an example of a unit that acquires one or more of plural pieces of data from one or more of plural users in a state where other users are restricted from viewing the one or more pieces of data, in response to receiving of a print request.

The image integrating unit 61E generates one file by integrating file exchange images received from the individual users by the individual image receiving unit 61D.

The file ID issuing unit 61F issues a file ID that identifies the file generated by the image integrating unit 61E. Here, the file ID may be, for example, a character string.

The correspondence information generating unit 61G generates correspondence information in which the images from the individual users integrated by the image integrating unit 61E are associated with the file ID issued by the file ID issuing unit 61F, and stores the correspondence information in the database 63. Further, each image may be associated with a user ID of a user who transmitted the image.

The file ID transmitting unit 61H transmits the file ID to the messaging server 30 such that a message notifying the user of the file ID is transmitted from the BOT in the group talk room. In the present exemplary embodiment, the file ID transmitting unit 61H is provided as an example of a unit that performs control such that one piece of data identification information that identifies one or more pieces of data is notified to a specific user.

The file ID receiving unit 62A receives a file ID from the image processing apparatus 70 and acquires correspondence information including this file ID from the database 63.

The file acquiring unit 62B acquires a file associated with the correspondence information acquired by the file ID receiving unit 62A. Specifically, as will be described later, since the correspondence information includes a file storage location, the file is acquired from this file storage location.

The determining unit 62C determines whether or not the file acquired by the file acquiring unit 62B is an exchange target file. Specifically, as will be described later, since the correspondence information includes a file exchange flag indicating whether or not the file is an exchange target file, this determination is made by referring to the file exchange flag. Then, when it is determined that the file acquired by the file acquiring unit 62B is the exchange target file, the user ID requesting unit 62D is called.

The user ID requesting unit 62D transmits an instruction to input a user ID of a user requesting printing, and requests the image processing apparatus 70 to input the user ID.

The user ID receiving unit 62E receives the user ID from the image processing apparatus 70.

The image excluding unit 62F deletes an image associated with the user ID from images included in the file acquired by the file acquiring unit 62B and determined to be the exchange target file by the determining unit 62C. That is, the image excluding unit 62F removes an image transmitted by the person in question from the file obtained by the image integrating unit 61E integrating the images. In the present exemplary embodiment, the image excluding unit 62F is provided as an example of a unit that prevents the one or more pieces of data from including the data acquired from the specific user.

The file transmitting unit 62G transmits a file from which the image transmitted by the person in question is excluded by the image excluding unit 62F, to the image processing apparatus 70 as a print target file.

The database 63 stores the above-mentioned correspondence information. A specific example of this correspondence information will be described later.

These functional units are implemented by the cooperation of software and hardware resources. Specifically, these functional units are implemented in the manner that the processor 51 reads a program for implementing the functional units from, for example, the HDD 53 into the main memory 52, and executes the program.

Next, the image processing apparatus 70 includes a display control unit 81, a file ID receiving unit 82, a file requesting unit 83, a user ID receiving unit 84, a user ID transmitting unit 85, a file receiving unit 86, and a print instructing unit 87.

The display control unit 81 controls the operation panel 75 (see FIG. 4) so as to display a message and a result of the operation from the print server 50. In particular, the display control unit 81 controls the operation panel 75 so as to display an instruction to input a user ID sent from the print server 50.

The file ID receiving unit 82 receives a file ID input by a user on the operation panel 75 (see FIG. 4).

The file requesting unit 83 requests a print target file by transmitting the file ID received by the file ID receiving unit 82 to the print server 50.

The user ID receiving unit 84 receives a user ID input by a user on the operation panel 75 (see FIG. 4).

The user ID transmitting unit 85 transmits the user ID received by the user ID receiving unit 84 to the print server 50.

The file receiving unit 86 receives the print target file from the print server 50.

The print instructing unit 87 instructs the image processing apparatus 70 to print based on the file received by the file receiving unit 86.

These functional units are implemented by the cooperation of software and hardware resources. Specifically, these functional units are implemented in the manner that the processor 71 reads a program for implementing the functional units from, for example, the ROM 73 into the RAM 72, and executes the program.

Figure 6:
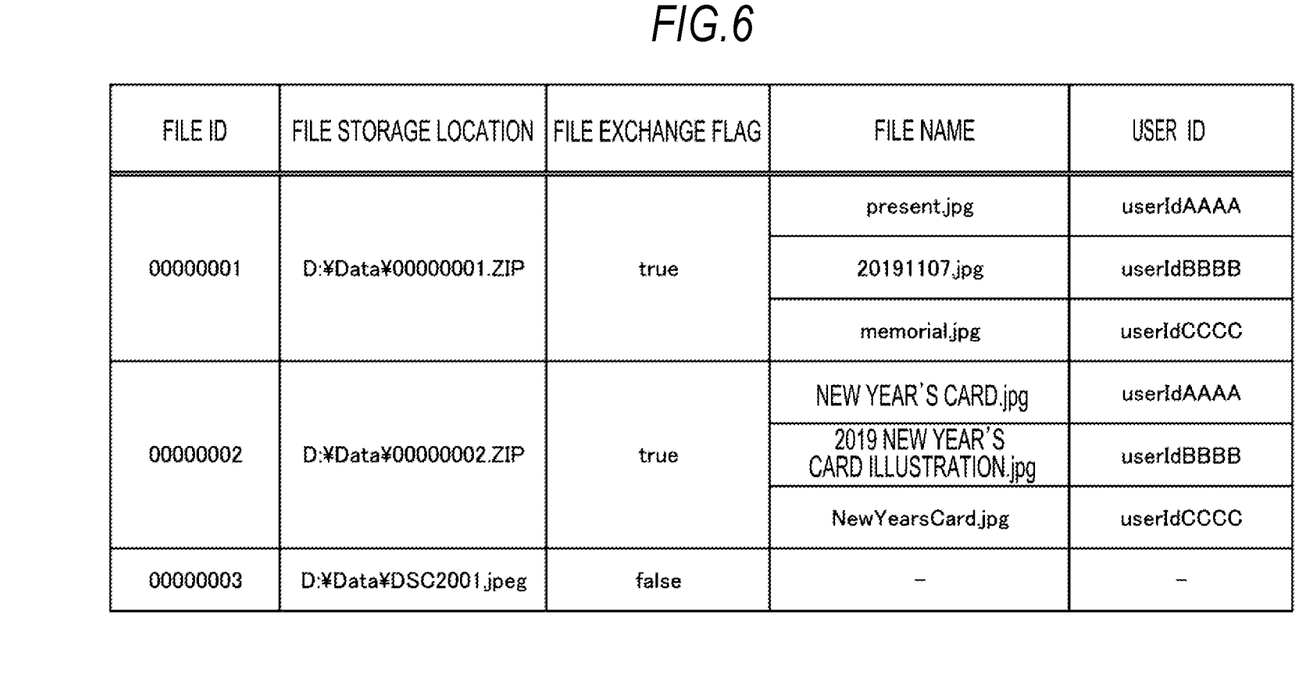
FIG. 6 is a diagram illustrating a specific example of correspondence information stored in a database of the print server according to the exemplary embodiment of the present disclosure.

FIG. 6 is a diagram illustrating a specific example of the correspondence information stored in the database 63. As illustrated in the figure, in the correspondence information, a file ID, a file storage location, a file exchange flag, an image name, and a user ID are associated with each other. The file ID is the identification information of a file. The file storage location is information indicating a location where the file identified by the corresponding file ID is stored. The file exchange flag is a flag indicating whether or not the file identified by the corresponding file ID is a file exchange target. The file exchange flag "true" indicates that the file identified by the corresponding file ID is the file exchange target, and the file exchange flag "false" indicates that the file identified by the corresponding file ID is not the file exchange target. The image name is the name of an image included in the file identified by the corresponding file ID. The user ID is the identification information of a user who has transmitted an image having a corresponding image name.

Here, the correspondence information whose file ID is "00000001" will be described. The file ID "00000001" is associated with "D:¥Data¥00000001.ZIP" as the file storage location and "true" as the file exchange flag. From this, it can be seen that "D: ¥Data¥00000001.ZIP" is a file generated by image integration. Then, from the image name column, it can be seen that the integrated images are three images, that is, "present.jpg", "20091107.jpg", and "memorial.jpg". It can also be seen from the user ID column that user IDs of users who have transmitted these three images are "userIdAAAA", "userIdBBBB", and "userIdCCCC", respectively.

In printing, first, a file ID is input to the image processing apparatus 70, and a file exchange flag associated with the file ID is checked. When the file exchange flag is "true", a user is prompted to input a user ID through the image processing apparatus 70. When the user ID is input, an image associated with this user ID is specified from a list of image names, and a file excluding the image is transmitted to the image processing apparatus 70 and is printed with the image processing apparatus 70.

Operation of Print System

Here, the operation of the print system 1 when exchanging a file between a user A, a user B, and a user C will be described. As a premise of the operation, it is assumed that a group talk room in which the user A, the user B, the user C, and a BOT participate exists.

Figure 7:
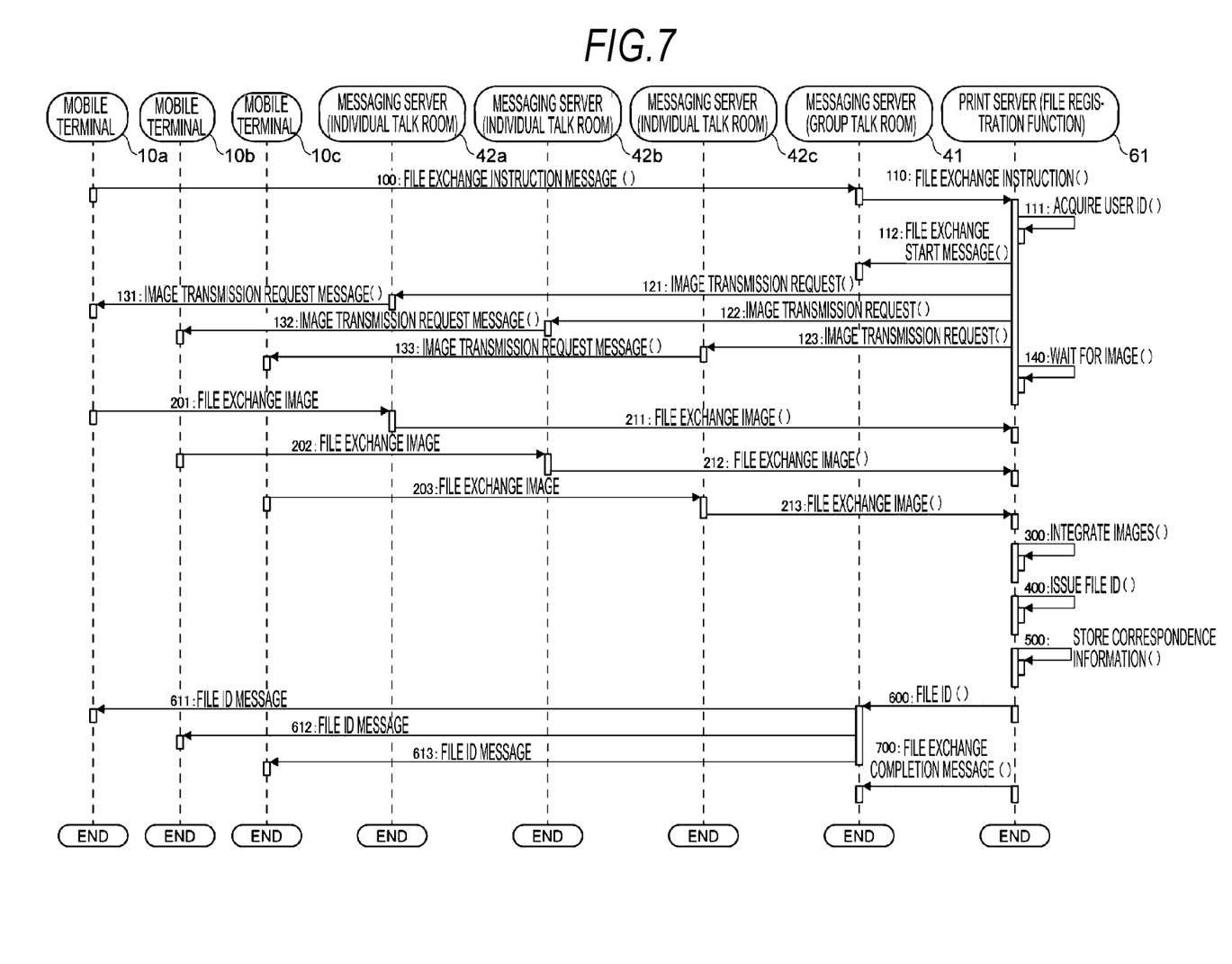
FIG. 7 is a sequence diagram illustrating an example of an operation when a file of the print system is registered according to the exemplary embodiment of the present disclosure.

FIG. 7 is a sequence diagram illustrating an operation example when registering a file of the print system 1. Here, in the individual talk room managing unit 42 of the messaging server 30, a part that manages an individual talk room of the user A is referred to as an "individual talk room managing unit 42*a*", a part that manages an individual talk room of the user B is referred to as an "individual talk room managing unit 42*b*", and a part that manages an individual talk room of the user C is referred to as an "individual talk room managing unit 42*c*". It is noted that, in the figure, the group talk room managing unit 41, the individual talk room managing unit 42*a*, the individual talk room managing unit 42*b*, and the individual talk room managing unit 42*c* are abbreviated as a "group talk room 41", an "individual talk room 42*a*", an "individual talk room 42*b*", and an "individual talk room 42*c*", respectively.

First, when the user A performs an operation of instructing a file exchange in the group talk room displayed on the mobile terminal 10*a*, the data transmitting/receiving unit 22 in the mobile terminal 10*a* transmits a file exchange instruction message instructing the file exchange to the messaging server 30 (step 100). Here, the operation of instructing the file exchange may be, for example, an operation of inputting a character string "file exchange" to transmit a message. It is noted that this is just an example. The operation of instructing the file exchange is not limited thereto. The operation of instructing the file exchange may be an operation such as pressing a button instead of the operation of inputting the character string. Further, in the figure, the user A performs the operation of instructing the file exchange, but any user who is a group participant may perform such an operation.

Then, in the messaging server 30, the group talk room managing unit 41 transmits a file exchange instruction by the user A to the file registration function 61 of the print server 50 (step 110).

As a result, in the file registration function 61 of the print server 50, the user ID acquiring unit 61B acquires a user ID of a user (excluding a BOT) currently participating in a group from a group talk room which is the transmission source of the file exchange instruction (step 111). Here, the user ID is the identification information that uniquely identifies a user, as described above.

Then, the file registration function 61 of the print server 50 transmits a file exchange start message to the messaging server 30 such that a user participating in a group is informed in the group talk room that the file exchange is about to be performed (step 112). In the messaging server 30, the group talk room managing unit 41 transmits a message to each mobile terminal 10, but the sequence is omitted in the figure. The file exchange start message is transmitted such that the image transmission request in the next step does not suddenly occur, but the file exchange start message may not be transmitted when the transmission thereof is unnecessary.

Next, in the file registration function 61 of the print server 50, the individual message transmitting unit 61C transmits an image transmission request to the messaging server 30 such that a file exchange image is transmitted to the user A in the individual talk room of the user A (step 121). Then, in the messaging server 30, the individual talk room managing unit 42*a* transmits an image transmission request message to the mobile terminal 10*a* (step 131).

Further, in the file registration function 61 of the print server 50, the individual message transmitting unit 61C transmits an image transmission request to the messaging server 30 such that a file exchange image is transmitted to the user B in the individual talk room of the user B (step 122). Then, in the messaging server 30, the individual talk room managing unit 42*b* transmits an image transmission request message to the mobile terminal 10*b* (step 132).

Further, in the file registration function 61 of the print server 50, the individual message transmitting unit 61C transmits an image transmission request to the messaging server 30 such that a file exchange image is transmitted to the user C in the individual talk room of the user C (step 123). Then, in the messaging server 30, the individual talk room managing unit 42*c* transmits an image transmission request message to the mobile terminal 10*c* (step 133).

Here, it is assumed that the file registration function 61 of the print server 50 transmits the image transmission request to each user's individual talk room such that the file exchange image is transmitted to the individual talk room. This can be regarded as transmitting the image transmission request message to the individual talk room in response to the file exchange instruction in the group talk room. It is noted that the operation when transmitting the image transmission request message is not limited thereto. The image transmission request may be transmitted to the group talk room such that the file exchange image is transmitted to the individual talk room.

At this time, in the file registration function 61 of the print server 50, the individual image receiving unit 61D waits for an image to be transmitted from the messaging server 30 (step 140). Specifically, the individual image receiving unit 61D waits for an image to be transmitted from each user's individual talk room. In the figure, it is assumed that the individual image receiving unit 61D waits for an image to be transmitted from all the users participating in a group, but it is not always necessary to wait until the image is transmitted from all the users. For example, when the predetermined deadline is reached, the next step or later may be performed even if the image has not been transmitted from all the users. Further, when the image is not transmitted from any user, the group talk room may be notified that the file exchange has been canceled, and the subsequent processing may not be performed.

Then, when the user A performs an operation of transmitting a file exchange image in the individual talk room displayed on the mobile terminal 10*a*, the data transmitting/receiving unit 22 in the mobile terminal 10*a* transmits the file exchange image to the messaging server 30 (step 201). Then, the individual talk room managing unit 42*a* in the messaging server 30 transmits the file exchange image to the file registration function 61 of the print server 50 (step 211).

Further, when the user B performs an operation of transmitting a file exchange image in the individual talk room displayed on the mobile terminal 10*b*, the data transmitting/receiving unit 22 in the mobile terminal 10*b* transmits the file exchange image to the messaging server 30 (step 202). Then, the individual talk room managing unit 42b in the messaging server 30 transmits the file exchange image to the file registration function 61 of the print server 50 (step 212).

Further, when the user C performs an operation of transmitting a file exchange image in the individual talk room displayed on the mobile terminal 10c, the data transmitting/receiving unit 22 in the mobile terminal 10c transmits the file exchange image to the messaging server 30 (step 203). Then, the individual talk room managing unit 42c in the messaging server 30 transmits the file exchange image to the file registration function 61 of the print server 50 (step 213).

Next, in the file registration function 61 of the print server 50, the image integrating unit 61E generates one file by integrating the images transmitted by the users A, B, and C and received from the individual talk room managing units 42a, 42b, and 42c of the messaging server 30 (step 300). Here, a method of integrating the images is not particularly limited. For example, the three images may be compressed in ZIP format to be integrated into one file. One file ID and plural images may be managed in association without generating an integrated file.

Next, the file ID issuing unit 61F issues a file ID to the one file generated by the image integration in step 300 (step 400).

Next, the correspondence information generating unit 61G generates correspondence information and saves the generated correspondence information in the database 63 (step 500). Here, in the correspondence information, as described above, the file ID, the file storage location, and the file exchange flag are associated with each other. When the file exchange flag is "true", the image name and the user ID are associated with each for each image included in the file.

Next, the file ID transmitting unit 61H transmits the file ID to the messaging server 30 such that the file ID issued in step 400 is informed in the group talk room to users participating in a group (step 600). Then, the group talk room managing unit 41 in the messaging server 30 transmits the file ID to the mobile terminals 10a to 10c (steps 611 to 613). As a result, in the mobile terminals 10a to 10c, the display control unit 21 performs control so as to display, for example, a QR code (registered trademark) in which the file ID is embedded, on the touch panel 14 (see FIG. 2).

Then, the file registration function 61 of the print server 50 transmits a file exchange completion message to the messaging server 30 such that the users participating in the group are informed in the group talk room that the preparation for file exchange is completed (step 700). In the messaging server 30, the group talk room managing unit 41 transmits a message to each mobile terminal 10, but the sequence is omitted in the figure. Then, since a user performs a printing operation with the image processing apparatus 70, when informing that the preparation for file exchange is completed, the printing method and the like may also be informed. Further, since the printing may be performed if the file ID is known, it is not necessary to transmit this file exchange completion message.

Figure 8:
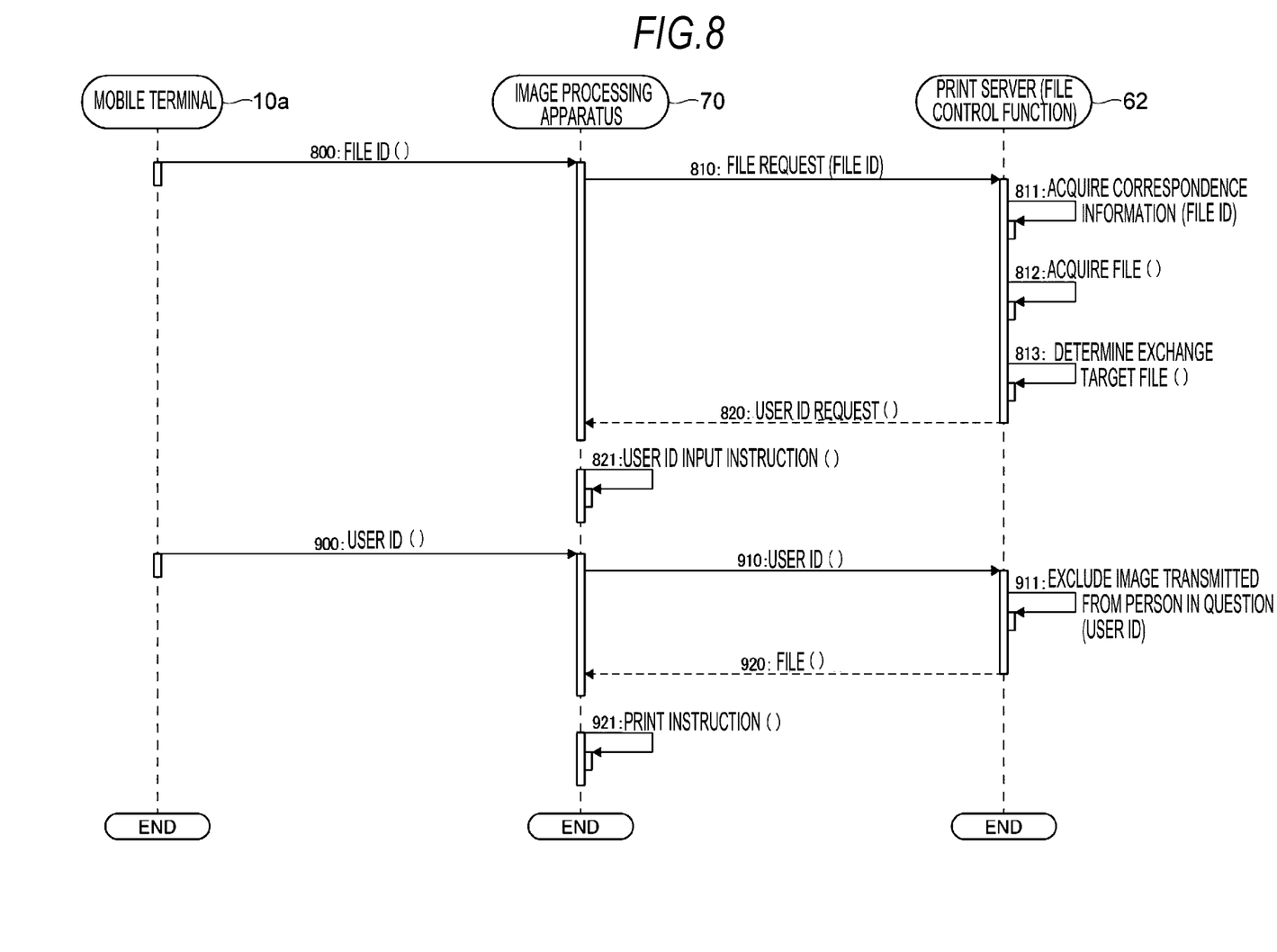
FIG. 8 is a sequence diagram illustrating an example of an operation when a printing is performed with the print system according to the exemplary embodiment of the present disclosure.

FIG. 8 is a sequence diagram illustrating an operation example when performing printing of the print system 1.

First, when the user A displays a QR code (registered trademark) in which a file ID is embedded, on the mobile terminal 10a and performs an operation of illuminating the QR code on the image processing apparatus 70 to read the QR code, the file ID receiving unit 82 in the image processing apparatus 70 receives the file ID (step 800). Here, a method of inputting the file ID to the image processing apparatus 70 is merely an example and is not limited thereto.

For example, a method of inputting using a software keyboard displayed on the operation panel 75 (see FIG. 4) of the image processing apparatus 70, a method of inputting by voice, or the like may be used. Further, although the figure illustrates that the user A performs a printing, any user may perform a printing as long as the user is a group participant.

Then, in the image processing apparatus 70, the file requesting unit 83 requests the print control function 62 of the print server 50 to provide a file by transmitting the file ID received in step 800 (step 810).

As a result, in the print control function 62 of the print server 50, the file ID receiving unit 62A receives the file ID transmitted in step 810 and searches the database 63 using this file ID as a key to acquire the correspondence information associated with this file ID (step 811).

Next, the file acquiring unit 62B acquires a print target file from the file storage location included in the correspondence information acquired in step 811 (step 812).

Next, the determining unit 62C refers to the file exchange flag included in the correspondence information acquired in step 811 to determine whether or not the file acquired in step 812 is an exchange target file (step 813). When it is determined that the file acquired in step 812 is the exchange target file, the following process is performed, and otherwise, the file acquired in step 812 is transmitted as it is to the image processing apparatus 70.

Here, a case where it is determined that the file acquired in step 812 is the exchange target file will be described. In this case, the user ID requesting unit 62D requests the image processing apparatus 70 to provide a user ID (step 820). The display control unit 81 in the image processing apparatus 70 receives a request from the print control function 62 of the print server 50 and controls to display an instruction prompting input of a user ID on the operation panel 75 (see FIG. 4) (step 821).

Then, when the user A displays a QR code (registered trademark) in which the user ID of the user A is embedded, on the mobile terminal 10a and performs an operation of illuminating the QR code on the image processing apparatus 70 to read the QR code, the user ID receiving unit 84 in the image processing apparatus 70 receives the user ID (step 900). Here, a method of inputting the user ID to the image processing apparatus 70 is merely an example and is not limited thereto. For example, a method of inputting using a software keyboard displayed on the operation panel 75 (see FIG. 4) of the image processing apparatus 70, a method of inputting by voice, or the like may be used.

Then, the user ID transmitting unit 85 in the image processing apparatus 70 transmits the user ID received in step 900 to the print control function 62 of the print server 50 (step 910).

As a result, in the print control function 62 of the print server 50, the image excluding unit 62F receives the user ID transmitted in step 910 and performs a process of excluding an image transmitted by a person in question based on this user ID (step 911). Specifically, the image excluding unit 62F specifies an image associated with the received user ID from plural images included in the correspondence information acquired in step 811 and excludes this specified image from the file acquired in step 812. Then, the file transmitting unit 62G transmits the file from which the image transmitted by the person in question is excluded by the image excluding unit 62F, to the image processing apparatus 70 (step 920). If none of images associated with the received user ID exist in the plural images included in the correspondence information acquired in step 811, it may be regarded as a print request from a user who does not participate in a group talk (dose not participate in file exchange), and the fact that printing is not possible may be transmitted to the image processing apparatus 70.

As a result, in the image processing apparatus 70, the file receiving unit 86 receives a file from the print server 50, and the print instructing unit 87 instructs the image forming unit 77 (see FIG. 4) to print the received file (step 921). Then, the file is printed by the image forming unit 77.

Then, the user A receives the file printed by the image forming unit 77. At that time, the printed file includes an image transmitted by a user other than the user A. On the other hand, when the user B prints, a file including an image transmitted by a user other than the user B is printed, and when the user C prints, a file including an image transmitted by a user other than the user C is printed.

Modifications

In the above exemplary embodiment, it is assumed that the file exchange is performed within one group. In reality, the file exchange is performed within each of plural groups. In that case, it is necessary to prevent an image transmitted for file exchange in one group from being mixed with an image transmitted for file exchange in another group.

Therefore, in a first modification, the individual image receiving unit 61D has an image receiving function of receiving images transmitted from users, and the image integrating unit 61E has an image sorting function of sorting those images according to a rule. Then, the file ID issuing unit 61F issues a file ID, and the correspondence information generating unit 61G generates correspondence information in which an image group obtained by sorting by the image integrating unit 61E is associated with the file ID issued by the file ID issuing unit 61F.

That is, the image integrating unit 61E sorts plural images individually transmitted by plural users to the print server 50 according to a rule. Then, an image group obtained by the sorting is managed in association with the file ID, and when the file ID is input from the image processing apparatus 70, the image group associated with this file ID is collectively printed.

Hereinafter, four implementation examples of the first modification will be described with a focus on what kind of functions the image receiving function and the image sorting function are specifically used.

In a first implementation example, the image receiving function is a function of receiving an image transmitted from an individual talk room of a messaging service app, and the image sorting function is a function of sorting so as to give only images from users participating in a group talk room where a file exchange instruction is given. This implementation example corresponds to an implementation example described in the above exemplary embodiment.

Specifically, a user transmits a file exchange instruction to the print server 50 on the group talk room of the messaging service app. As a result, the print server 50 issues one file ID. Then, the print server 50 prompts each user in the group to transmit an image in the individual talk room, and each user transmits the image in the individual talk room. The print server 50 manages the image transmitted from the user participating in the group talk room where the file exchange instruction is given, in association with the issued file ID.

This first implementation example is an example of a case where the state where the viewing is restricted is implemented by the individual use units that the one or more users individually use and the individual use units are posting areas on the messaging service for the individual users.

In a second implementation example, the image receiving function is a function of receiving an image attached to an e-mail transmitted to a specific e-mail address, and the image sorting function is a function of sorting so as to give only images from mail addresses of plural users designated by a file exchange instruction.

Specifically, a user transmits a file exchange instruction to the print server 50 by designating e-mail addresses of plural users. As a result, the print server 50 issues one file ID. Then, the print server 50 individually transmits e-mails to the designated e-mail addresses with an image attached to the e-mails. The print server 50 manages the image attached to the e-mails from the e-mail addresses designated by the file exchange instruction in association with the issued file ID.

This second implementation example is an example of a case where the state where the viewing is restricted is implemented by the individual use units that the one or more users individually use and the individual use units are e-mails.

In a third implementation example, the image receiving function is a function of receiving an image uploaded to the print server 50, and the image sorting function is a function of sorting so as to give only an image uploaded to a URL for a group.

Specifically, a user transmits a file exchange instruction to the print server 50. As a result, the print server 50 generates one file ID and a URL for a group and responds to the user. The user informs plural users of the URL for the group and prompts the plural users to upload an image. Each user uploads an image to the informed URL. The print server 50 manages the image uploaded to the URL in association with the issued file ID.

In a fourth implementation example, the image receiving function is a function of receiving an image uploaded to a specific URL of the print server 50, and the image sorting function is a function of sorting so as to give only an image uploaded to a specific URL with an added identification tag for a group.

Specifically, a user transmits a file exchange instruction to the print server 50. As a result, the print server 50 generates one file ID and an identification tag for a group and responds to the user. Alternatively, the user may designate an identification tag as long as the identification tag does not overlap with identification tags of other groups. Here, the identification tag may be an identification number. The user informs plural users of a specific URL and an identification tag and prompts the plural users to upload an image. Each user uploads an image to the informed specific URL. At that time, each user also uploads the identification tag. The print server 50 manages the image upload to the specific URL with an added designated identification tag in association with the issued file ID.

The third and fourth implementation examples are examples of a case where the state where the viewing is restricted is implemented by having the one or more users store the one or more pieces of data in the common memory area but restricting the other users from viewing the one or more pieces of data and the memory area is designated by a URL.

By the way, in the above-described exemplary embodiment and first modification, since the concept of time is not adopted, there is a possibility that the image group associated with the file ID is not the same at a certain time and another time. In the above-described exemplary embodiment, it is assumed that the registration of images from all users is mandatory and a file ID is issued after the receiving of images from all users is completed. Then, when the file ID is input, the images from all users are printed to avoid half-finished printing. This is an example of (i) performing control such that data identification information that identifies plural pieces of data is notified to a specific user after the plural pieces of data are acquired, and (ii) when the data identification information is received from the specific user, performing control such that the plural pieces of data identified by the data identification information is printed. However, a method of issuing the file ID and a method of printing a file by inputting the file ID are not limited thereto.

Hereinafter, another method will be described as a second modification.

As a second modification, first, it may be considered to issue a file ID in a state where the receiving of images from all users is not completed, and then associate images received from the users with the file ID.

In that case, if the receiving of images from all users is not completed at the point of time when the file ID is input, the file ID may not be valid and the file may not be printed. This is an example of (i) performing control such that data identification information that identifies one or more pieces of data is notified to a specific user before plural pieces of data are acquired, and (ii) when the data identification information is received from the specific user, performing control such that the one or more pieces of data identified by the data identification information are not printed unless the plural pieces of data are acquired.

Alternatively, even if the receiving of images from all users is not completed at the point of time when the file ID is input, the file ID may be valid and the file may be printed. That is, an image associated with the file ID may be printed at the point of time when the file ID is input. This is an example of (i) performing control such that data identification information that identifies one or more pieces of data is notified to a specific user before plural pieces of data are acquired, and (ii) when the data identification information is received from the specific user, performing control such that the one or more pieces of data identified by the data identification information are at least printed even if the plural pieces of data are not acquired. Then, if a new image is received at the point of time when the file ID is input again, only the newly received image may be printed. This is an example of performing control such that when the data identification information is received from the specific user for the second time or later, data acquired after the previous time the data identification information is received from the specific user among the data identified by the data identification information are printed. Alternatively, if a new image is received at the point of time when the file ID is input again, all the images may be printed again.

Further, as the second modification, it may be also considered to issue a file ID when a predetermined time elapses from some event even before the receiving of images from all users is completed, and then not to register an image with an identification tag of the event received from a user. In that case, when the file ID is input, only an image received from some event until a predetermined time elapses is printed with one print operation.

Further, in the above-described exemplary embodiment, the file ID is associated with the file including the images from all the users, and an image from a user with an input user ID is excluded. This is an example of (i) performing control such that one piece of data identification information that identifies data including (a) data acquired from a specific user and (b) one or more pieces of data is notified to the specific user, and (ii) when the data identification information and user identification information that identifies the specific data are received from the specific user, performing control such that the one or more pieces of data identified by (a) the data identification information and (b) the user identification information are printed. However, a method of excluding an image from a specific user is not limited thereto.

Hereinafter, another method will be described as a third modification. The third modification is to associate a file ID with a file including images obtained by excluding an image from a specific user from images from all users. As a result, when printing the file, it is possible to print the file including the images obtained by excluding the image from the specific user without inputting a user ID of the specific user. This is an example of (i) performing control such that one piece of data identification information that identifies one or more pieces of data is notified to a specific user, and (ii) when the data identification information is received from the specific user, performing control such that the one or more pieces of data identified by the data identification information are printed.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The process performed by the print server 50 in the present exemplary embodiment is prepared as, for example, a program such as application software.

That is, the program that implements the present exemplary embodiment can be regarded as a program that causes a computer to implement a function of receiving a print request from a specific user to collectively print plural pieces of data held by plural users, a function of acquiring one or more of the plural pieces of data from one or more of the plural users in a state where other users are restricted from viewing the one or more pieces of data, in response to the receiving of the print request, and a function of performing control such that the one or more pieces of data are printed.

Further, the program that implements the present exemplary embodiment may be provided not only by a communication unit but also by storing the program in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print control device comprising:
a processor configured to:
receive a file exchange request to exchange a plurality of pieces of data held by a plurality of users;
in response to receiving the file exchange request, individually acquire the plurality of pieces of data from the plurality of users in a state where a respective user of the plurality of users is restricted from viewing data sent from the other users of the plurality of users;
receive a print request from a specific user to collectively print the plurality of pieces of data; and
in response to receiving the print request, perform control such that one or more pieces of the plurality of pieces of data are printed.

2. The print control device according to claim 1, wherein the state in which the viewing is restricted is implemented by individual use units that the plurality of users individually use.

3. The print control device according to claim 2, wherein the individual use units are posting areas on a messaging service for the individual users or e-mails.

4. The print control device according to claim 1, wherein the state in which the viewing is restricted is implemented by having the respective user of the plurality of users store the one or more pieces of data in a common memory area but restricting the other users from viewing the one or more pieces of data.

5. The print control device according to claim 4, wherein the memory area is designated by a uniform resource locator (URL).

6. The print control device according to claim 1, wherein the one or more pieces of the plurality of pieces of data, which are printed in response to the print request, do not include data acquired from the specific user.

7. The print control device according to claim 6, wherein
the processor is configured to perform control such that one piece of data identification information that identifies the one or more pieces of the plurality of pieces of data is notified to the specific user, and
the performing the control such that the one or more pieces of the plurality of pieces of data are printed includes performing control such that when the data identification information is received from the specific user, the one or more pieces of the plurality of pieces of data identified by the data identification information are printed.

8. The print control device according to claim 6, wherein
the processor is configured to perform control such that one piece of data identification information that identifies data including (i) data acquired from the specific user and (ii) the one or more pieces of the plurality of pieces of data is notified to the specific user, and
the performing the control such that the one or more pieces of the plurality of pieces of data are printed includes performing control such that when the data identification information and user identification information that identifies the specific user are received from the specific user, the one or more pieces of the plurality of pieces of data identified by (i) the data identification information and (ii) the user identification information are printed.

9. The print control device according to claim 1, wherein
the processor is configured to perform control such that one piece of data identification information that identifies the one or more pieces of the plurality of pieces of data is notified to the specific user, and
the performing the control such that the one or more pieces of the plurality of pieces of data are printed includes performing control such that when the data identification information is received from the specific user, the one or more pieces of the plurality of pieces of data identified by the data identification information are printed.

10. The print control device according to claim 9, wherein
the performing the control such that the data identification information is notified includes performing control such that the data identification information that identifies the plurality of pieces of data is notified to the specific user after the plurality of pieces of data are acquired, and
the performing the control such that the one or more pieces of the plurality of pieces of data are printed includes performing control such that when the data identification information is received from the specific user, the plurality of pieces of data identified by the data identification information are printed.

11. The print control device according to claim 9, wherein
the performing the control such that the data identification information is notified includes performing control such that the data identification information that identifies the one or more pieces of the plurality of pieces of data is notified to the specific user before the plurality of pieces of data are acquired, and
the performing the control such that the one or more pieces of the plurality of pieces of data are printed includes performing control such that when the data identification information is received from the specific user, the one or more pieces of the plurality of pieces of data identified by the data identification information are not printed unless the plurality of pieces of data are acquired.

12. The print control device according to claim 9, wherein
the performing the control such that the data identification information is notified includes performing control such that the data identification information that identifies the one or more pieces of the plurality of pieces of data are notified to the specific user before the plurality of pieces of data are acquired, and
the performing the control such that the one or more pieces of the plurality of pieces of data are printed includes performing control such that when the data identification information is received from the specific user, the one or more pieces of the plurality of pieces of data identified by the data identification information are at least printed even if the plurality of pieces of data are not acquired.

13. The print control device according to claim 12, wherein
the performing the control such that the one or more pieces of the plurality of pieces of data are printed includes performing control such that when the data identification information is received from the specific user for a second time or later, data newly acquired after the data identification information is received from the specific user among the data identified by the data identification information is printed.

14. A non-transitory computer readable medium storing a program that causes a computer to execute a print control process, the print control process comprising:
receiving a file exchange request to exchange a plurality of pieces of data held by a plurality of users;
in response to receiving the file exchange request, individually acquiring the plurality of pieces of data from the plurality of users in a state where a respective user of the plurality of users is restricted from viewing data sent from the other users of the plurality of users;

receiving a print request from a specific user to collectively print the plurality of pieces of data; and in response to receiving the print request, performing control such that one or more pieces of the plurality of pieces of data are printed.

15. A print control method comprising:

receiving a file exchange request to exchange a plurality of pieces of data held by a plurality of users;

in response to receiving the file exchange request, individually acquiring the plurality of pieces of data from the plurality of users in a state where a respective user of the plurality of users is restricted from viewing data sent from the other users of the plurality of users;

receiving a print request from a specific user to collectively print the plurality of pieces of data; and in response to receiving the print request, performing control such that one or more pieces of the plurality of pieces of data are printed.

* * * * *